(12) United States Patent
De Cock

(10) Patent No.: US 9,472,961 B2
(45) Date of Patent: Oct. 18, 2016

(54) METHOD OF FORMING A BALANCING CIRCUIT FOR A PLURALITY OF BATTERY CELLS AND STRUCTURE THEREFOR

(71) Applicant: Bart De Cock, Wespelaar (BE)

(72) Inventor: Bart De Cock, Wespelaar (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 568 days.

(21) Appl. No.: 13/776,375

(22) Filed: Feb. 25, 2013

(65) Prior Publication Data
US 2014/0239901 A1    Aug. 28, 2014

(51) Int. Cl.
*H02J 7/00*    (2006.01)

(52) U.S. Cl.
CPC .................... *H02J 7/0019* (2013.01)

(58) Field of Classification Search
USPC .......................................... 320/121
See application file for complete search history.

(56) References Cited

U.S. PATENT DOCUMENTS

| 8,120,321 B2 | 2/2012 | Vezzini et al. |
| 8,198,862 B2 | 6/2012 | Zhang et al. |
| 8,232,768 B2 | 7/2012 | Hou et al. |
| 8,242,745 B2 | 8/2012 | Zhang et al. |
| 8,288,992 B2 * | 10/2012 | Kramer ........... H02J 7/0016 320/117 |
| 2008/0191663 A1 | 8/2008 | Fowler et al. |
| 2011/0267005 A1 | 11/2011 | Gollob et al. |
| 2011/0316344 A1 | 12/2011 | Van Lammeren |

FOREIGN PATENT DOCUMENTS

| WO | 2010/051439 A2 | 5/2010 |
| WO | 2011/144509 A3 | 11/2011 |
| WO | 2012/040496 A1 | 3/2012 |

OTHER PUBLICATIONS

"A Review of Cell Equalization Methods for Lithium Ion and Lithium Polymer Battery Systems", Stephen W. Moore and Peter J. Schneider, Delphi Automotive Systems, Copyright © 2001 Society of Automotive Engineers, Inc., pp. 1-5.
"A New Battery Equalizer Based on Buck-boost Topology", THB1-1, Sang-Hyun Park et al., Korea Advanced Institute of Science and Technology Department of Electrical Engineering and Computer Science, The 7th International Conference on Power Electronics Oct. 22-26, 2007 / Exeo, Daegu, Korea, 978-1-4244-1872-5/08/ $25.00 © 2008 IEEE, pp. 962-965.

* cited by examiner

*Primary Examiner* — Eric Lee
(74) *Attorney, Agent, or Firm* — Robert F. Hightower

(57) ABSTRACT

In one embodiment, a method of forming a balancing circuit for a plurality of battery cells includes configuring the balancing circuit to selectively pre-charge a transfer element from a power source, and to subsequently selectively couple the transfer element to one battery cell of the plurality of battery cells to transfer energy from the transfer element to the one battery cell.

14 Claims, 5 Drawing Sheets

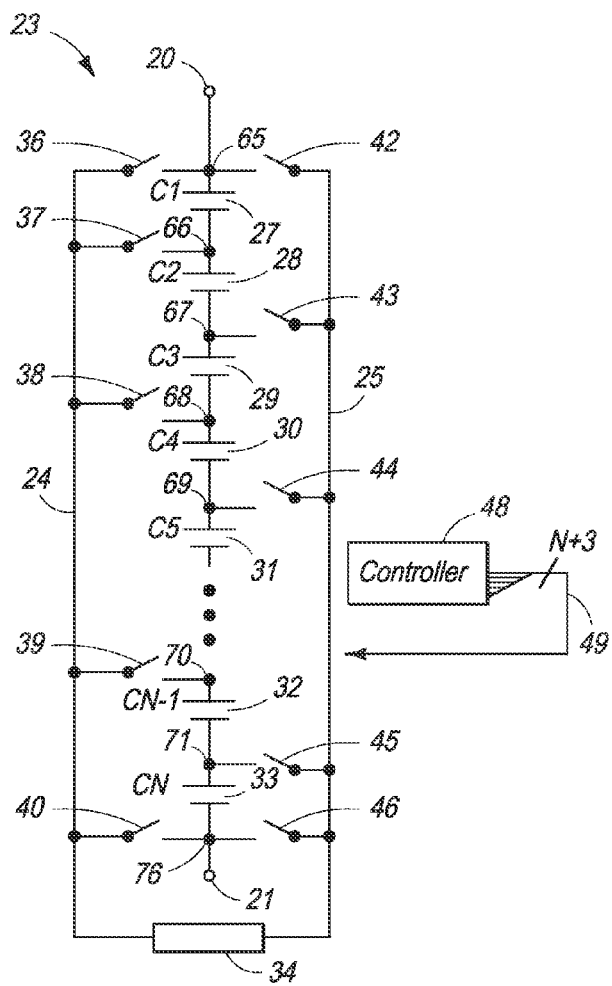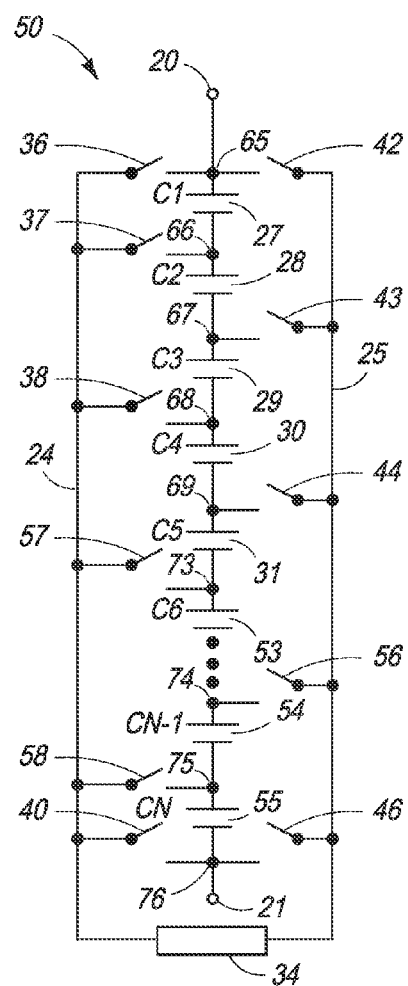
FIG. 2
FIG. 3

METHOD OF FORMING A BALANCING CIRCUIT FOR A PLURALITY OF BATTERY CELLS AND STRUCTURE THEREFOR

BACKGROUND OF THE INVENTION

The present invention relates, in general, to electronics, and more particularly, to semiconductors, structures thereof, and methods of forming semiconductor devices.

In the past, the electronics industry utilized various methods and structures to form charge balancing apparatus from battery systems such as nickel cadmium (NiCad) battery systems, nickel metal hydride (NiMH) battery systems, lithium-ion (LiON) battery systems, and other types of battery systems. It was often necessary to transfer energy from one battery cell to another battery cell in order to balance the voltages and energy storage of the cells to be as equal as possible. Some balancing system used transformers to assist in the balancing and other systems used inductors but were limited in the manner in which the inductors could be used to accomplish the energy transfers. The inductor based systems also usually required several transfer cycles in order to balance the states of other of the cells after one cell receives the energy transfer.

Accordingly, it is desirable to have a method of forming a balancing circuit that does not require a transformer, that reduces the time required for the energy transfers, and that facilitates using an inductor in multiple manners to accomplish the energy transfers.

BRIEF DESCRIPTION OF THE DRAWINGS

FIG. 2 schematically illustrates an example of an embodiment of a portion of a cell group that includes a switch matrix in accordance with the present invention;

FIG. 3 schematically illustrates an example of an embodiment of a portion of a cell group that includes a switch matrix that is an alternate embodiment of the switch matrix of FIG. 2 in accordance with the present invention;

Figure 1:
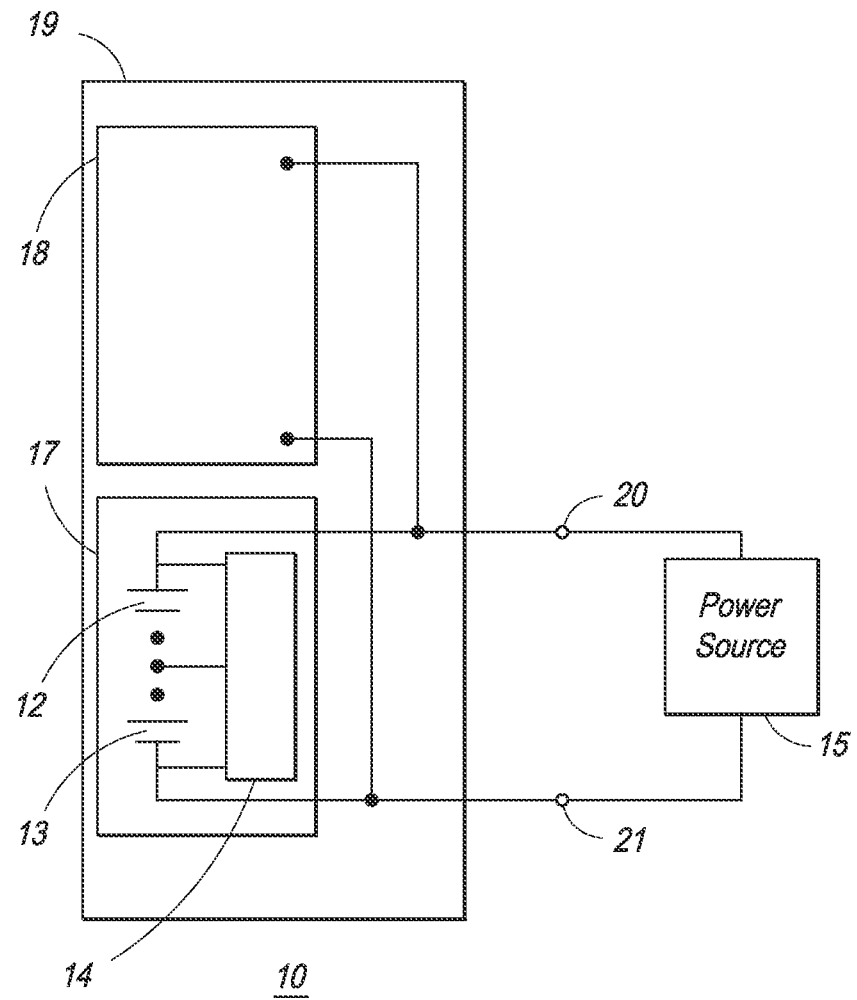
FIG. 1 schematically illustrates one example of an embodiment of a portion of an energy storage system that includes a battery system in accordance with the present invention.

For simplicity and clarity of the illustration(s), elements in the figures are not necessarily to scale, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type of N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten per cent (10%) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic state or a low voltage or low logic state depending on whether positive or negative logic is used and negated may be either a low voltage or low logic state or a high voltage or high logic state depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

FIG. 1 schematically illustrates one example of an embodiment of a portion of an energy storage system 10 that includes a battery system 19. Battery system 19 includes a plurality of battery cell groups such as battery cell groups 17 and 18. Groups 17 and 18 each include a plurality of series-connected battery cells, such as battery cells 12 and 13, for storing energy. System 19 usually serves as a power storage element for an electric device, for example for an electric motor (not shown) for a Hybrid Electric Vehicle (HEV) (not shown). System 10 also includes a power source 15 that may be used to charge cell groups 17 and 18 such as by charging battery cells 12 and 13. Power source 15 may be an alternator or generator that is driven by an engine such as an internal combustion engine, or source 15 may be a household mains, or a switching power supply such as a pulse-width modulated power supply, or the electric motor of the HEV when the electric motor is driven as a generator. Each of cell groups 17 and 18 usually also includes a management control circuit 14 which may include a controller and a switch matrix that are used for managing the charge of cells such as cells 12 and 13. In some embodiments, there may be one management control circuit for a number of cell groups such as only one for both of cell groups 17 and 18.

Management control circuit 14 typically monitors the state of charge of each individual cell of group 17, such as cells 12 and 13. In one embodiment when the state of charge of a particular cell is different than a target state of charge, circuit 14 is configured to control the switch matrix to selectively enable switches of the switch matrix to selectively pre-charge a transfer element of group 17 prior to transferring charge to the particular cell such that the state of charge of the particular cell converges toward the target state of charge. In another embodiment, circuit 14 is configured to transfer energy between other cells of the plurality of series-connected battery cells to the particular cell such that the state of charge of the particular cell converges toward the target state of charge.

FIG. 2 schematically illustrates an example of an embodiment of a portion of a cell group 23 that is an alternate embodiment of either of groups 17 and 18 that were described in the description of FIG. 1. Cell group 23 includes a plurality of series-connected battery cells 27-33 that are an alternate embodiment of cells 12 and 13 that were described in the description of FIG. 1. For the example embodiment illustrated in FIG. 2, group 23 includes an odd number of series-connected battery cells 27-33 identified as cells C1 through CN-1 to CN, where N is an odd number. Group 23 also includes a switch matrix that has a plurality of switches, such as transistor switches as will be seen further hereinafter, including switches 36-40 and 42-46. Switches 37-39 and 43-45 may be referred to as ladder switches, and switches 36 and 42 and/or switches 40 and 46 may be referred to as a switch pair. In some embodiments, the switch matrix also includes nodes 65-71 and 76. Nodes 65-71 and 76 usually are configured to couple to terminals of cells 27-33 and in one embodiment may serve as matrix nodes. For example, node 65 is configured for coupling to a first terminal of cell 27, and node 66 is configured for coupling to a second terminal of cell 27 and to a first terminal of cell 28. As another example, node 76 is configured for coupling to a first terminal of cell 33, and node 71 is configured for coupling to a second terminal of cell 33. Each of switches 36-40 and 42-46 has a second terminal connected to one of a common node 24 or a common node 25. The switch matrix also includes a power input terminal 20 that is configured for coupling to receive power from a power source such as source 15 (FIG. 1) and a power return terminal or return 21 that is configured for coupling to return power to source 15. A transfer element 34 of group 23 assists in transferring energy to and/or from cells 27-33. Transfer element 34 may be an inductor that is connected in series between common nodes 24 and 25, or a combination of inductor, capacitive, and/or resistive elements. In the preferred embodiment, element 34 is a single inductor and is not a portion of a transformer. As will be seen further hereinafter, in one embodiment the switch matrix is configured to selectively pre-charge element 34 prior to transferring charge to anyone of cells 27-33.

In one embodiment, the switch matrix is a portion of a management control circuit such as circuit 14 that was explained in the description of FIG. 1. The management control circuit usually includes a controller 48 that may monitor the voltage from or the state of charge of cells 27-33. In some embodiments, controller 48 forms a balancing circuit for cells 27-33. Controller 48 typically has a plurality of outputs 49 that each carry a control signal for selectively controlling the state of one of switches 36-40 and 42-46, such as selectively enabling or disabling the switches. In the preferred embodiment, the switch matrix includes N+3 switches and controller 48 includes N+3 outputs, one output for each switch of the switch matrix. Switches 36-40 and 42-46 are configured such that each of nodes 65-76 may be individually selected and electrically coupled to element 34 for equalization of the individual cell state of charge toward a target state of charge. In one embodiment, controller 48 is configured to selectively enable some of switches 36-40 and 42-46 to selectively pre-charge element 34 prior to transferring energy from element 34 to a particular cell such that the state of charge of the particular cell converges toward the target state of charge. In another embodiment, controller 48 is configured to control switches 36-40 and 42-46 to transfer energy between one cell and another cell of the plurality of series-connected battery cells such that the state of charge of the one cell converges toward the target state of charge.

In one example operational sequence, assume that cell 29 has a low energy state or low state of charge and requires a transfer of energy into cell 29. The configuration of the switch matrix facilitates pre-charging element 34 from terminals 20 and 21, and then transferring charge from element 34 to at least one of cells 27-33. The power source from terminals 20 and 21 may be a power source external to the cells, such as from power source 15 for example, or may be the power source of the series combination of all of cells 27-33, or may be a combination of both. In one non-limiting example embodiment, to pre-charge element 34, controller 48 selectively asserts some control signals to enable switches 36 and 46, and negates the other of the control signals to disable the other of switches 36-40 and 42-46, to pre-charge element 34 with a polarity that allows charging cell 29. Controller 48 subsequently negates the control signals to switches 36 and 46 and asserts the control signals to close switches 43 and 38 in order to charge cell 29. In another embodiment, the configuration of the switch matrix may also facilitate transferring charge from one of cells 27-33 to an adjacent cell, such as transferring charge from one of cells 28 or 30 to cell 29. In another embodiment, controller 48 may detect the low energy state from cell 29 and selectively assert/negate appropriate ones of the control signals on outputs 49 to selectively enable and disable appropriate ones of switches 36-40 and 42-46 to pre-charge element 34 and to then transfer energy into cell 29.

For another example operational sequence, assume that cell 30 has a low energy state and requires an energy transfer. Controller 48 selectively asserts control signals to enable switches 42 and 40, and negates control signals to disable the other of switches 36-40 and 42-46, to pre-charge element 34 with a polarity that allows charging cell 30. Controller 48 subsequently negates the control signals to switches 42 and 40 to disable the switches, and also asserts the control signals to switches 38 and 44 to enable switches 38 and 44 in order to transfer energy from element 34 into cell 30. In another embodiment, controller 48 may detect the low energy state from cell 30 and selectively assert/negate appropriate ones of the control signals on outputs 49 to selectively enable and disable appropriate ones of switches 36-40 and 42-46 to pre-charge element 34 and to then transfer energy into cell 30.

Those skilled in the art will understand from the hereinbefore description of the example operations, that configuring a first switch pair, such as switches 36 and 42, and a second switch pair, such as switches 40 and 46, to selective pre-charge element 34 with a first polarity to charge a cell and/or to selectively pre-charge element 34 with a second polarity to charge a different cell facilitates transferring energy from element 34 to any of cells 27-33 without having to first pre-charge element 34 from one of cells 27-33 or from less than all of cells 27-33. Not having to use individual ones of or a small sub-set of cells 27-33 to pre-charge element 34 results in minimizing the loading or minimizing the removal of energy from any of cells 27-33 to pre-charge element 34. In the preferred embodiment, the first switch pair has two switches and each switch has one terminal commonly connected to a first node, such as node 65, that is configured for coupling to a first terminal of a first cell, such as cell 27. The second switch pair also has two switches and each switch has one terminal commonly connected to a second node, such as node 76, that is configured for coupling to a first terminal of a second cell that may be a last cell of the plurality of series-connected battery cells, such as to cell 33. Thus, two switch pair improve the operation efficiency by facilitating pre-charging element 34 with either polarity, in one non-limiting example from terminals 20 and 21, which can minimize having to redistribute energy among cells after transferring charge to one of the cells. This can be advantageous in the case where all cells except one are at substantially the same charge level. It can also reduce the time required to transfer charge to one cell or a small sub-set of the cells because there is no need to take extra time to re-distribute charge among cells after replenishing the one cell. The switch pairs also facilitate pre-charging element 34 from a power source without using any of cells 27-33 as a power source. Those skilled in the art will also appreciate that the switch pairs may also assist in charging element 34 from one or more of the cells of the string of cell prior to transferring charge to one or more of the cells.

FIG. 3 schematically illustrates an example of an embodiment of a portion of a cell group 50 that is an alternate embodiment of group 23 (FIG. 2) or either of groups 17 and 18 that were described in the description of FIG. 1. Cell group 50 includes a plurality of series-connected battery cells 27-31 and 53-55 that are an alternate embodiment of cells 27-33 (FIG. 2) and of cells 12 and 13 that were described in the description of FIG. 1. For the example embodiment illustrated in FIG. 3, group 50 includes an even number of cells identified as cells C1 through CN-1 to CN, where N is an even number. Group 50 also includes a switch matrix that has a plurality of switches, such as transistor switches as will be seen further hereinafter, including switches 36-38, 40, 42-44, 46, and 56-58. Because group 50 includes an even number of cells, the first and last ladder switches are configured to connect the corresponding cells to the same common node as opposed to FIG. 2 where first and last ladder switch are configured to connect the corresponding cells to different common nodes. For example the last cell, such as cell 55, of the plurality of series-connected battery cells has switch 58 configured to connect the second terminal of cell 55 to node 24 instead of to node 25 as was illustrated in FIG. 2. Group 50 usually includes a management circuit and a controller (not shown) that is an alternate embodiment of, and operates similarly to, controller 48 that was illustrated in FIG. 2 except that the switch matrix of group 50 has an odd number of switches, thus, the controller of group 50 has a different number of outputs than controller 48. The controller may form a balancing circuit for cells 27-31 and 53-55 similarly to controller 48. Cells 27-31 and 53-55 may be receive energy transfers in a manner similar to that described for group 23 in the description of FIG. 2.

Figure 4:
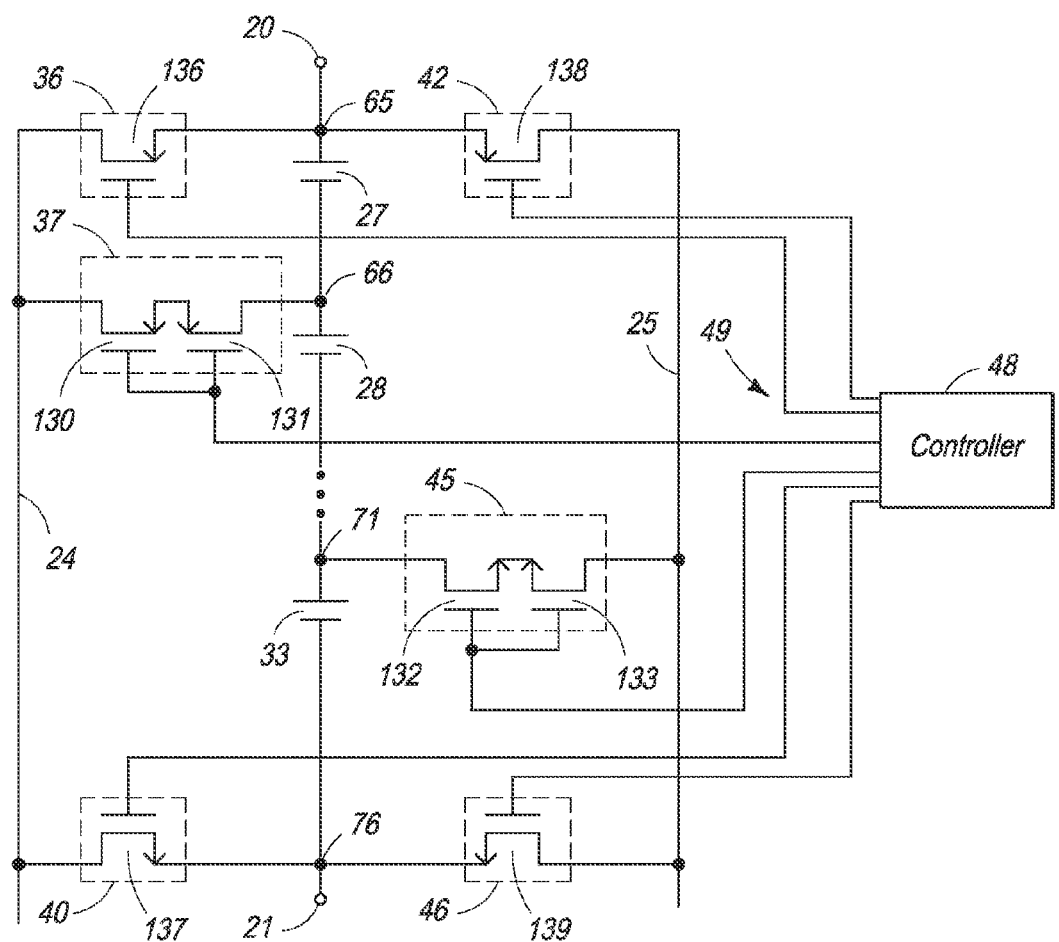
FIG. 4 schematically illustrates an example of an embodiment of a portion of some switches of the switch matrix of FIG. 2 in accordance with the present invention.

FIG. 4 schematically illustrates a non-limiting example of an embodiment of a portion of switches 36-37, 40, 42, and 45-46. Those skilled in the art will appreciate that an upper portion of the ladder switches usually are formed as P-type metal oxide semiconductor (MOS) or PMOS transistors and that a lower portion of the ladder switches usually are formed as N-type MOS or NMOS transistors. This configuration may assist in configuring the ladder transistors to be selectively enable more easily and/or with smaller or less expensive drivers. Typically, at least the first ladder switch is PMOS and the last ladder switch is NMOS. The exact position of the division between the upper and lower portions of the ladder switches may be selected based on the number of cells and the voltage formed on nodes 24 and 25. In other embodiments, all ladder switches may be P-type or N-type MOS transistors or other transistor types.

In one non-limiting example embodiment, switches 37 and 45 usually are formed as bidirectional switches that include two back-to-back transistors. In this non-limiting example embodiment, switch 37 includes PMOS transistors 130 and 131 that are configured to provide bidirectional current flow when switch 37, thus transistors 130 and 131 are enabled, and to prevent current flow when switch 37, thus transistors 130 and 131, are disabled. Transistor 130 has a drain connected to node 24 and a source connected to a source of transistor 131. A drain of transistor 131 is connected to node 66. Gates of transistors 130 and 131 are commonly connected together to receive one of the control signals on outputs 49. In this non-limiting example embodiment, each of switches 38, 43, 44 and 57 usually are formed similarly to switch 37.

In this non-limiting example embodiment or a different embodiment, switch 45 includes NMOS transistors 132 and 133 that also are configured to provide bidirectional current flow when switch 45, thus transistors 132 and 133 are enabled, and to prevent current flow when switch 45, thus transistors 132 and 133 are disabled. Transistor 133 has a drain connected to node 25 and a source connected to a source of transistor 132. A drain of transistor 132 is connected to node 71. Gates of transistors 132 and 133 are commonly connected together to receive a different one of the control signals on outputs 49. Those skilled in the art will appreciate that other transistor configurations may be used to provide the bi-direction current flow such as a transistor and a diode. In this non-limiting example embodiment, each of switches 39, 56, and 58 usually are formed similarly to switch 45.

Each of switches 36, 40, 42, and 46 usually are formed as a single transistor as illustrated by respective transistors 136-139.

Those skilled in the art will appreciate that element 34 may be discharged by opening all of the ladder switches and all the switch pairs which may cause the voltage of element 34 to increase to a value that causes current to flow through the body diodes (not shown) of some of the transistors used to implement the switch pairs and into some of cells 27-33 (FIG. 2).

Figure 5:
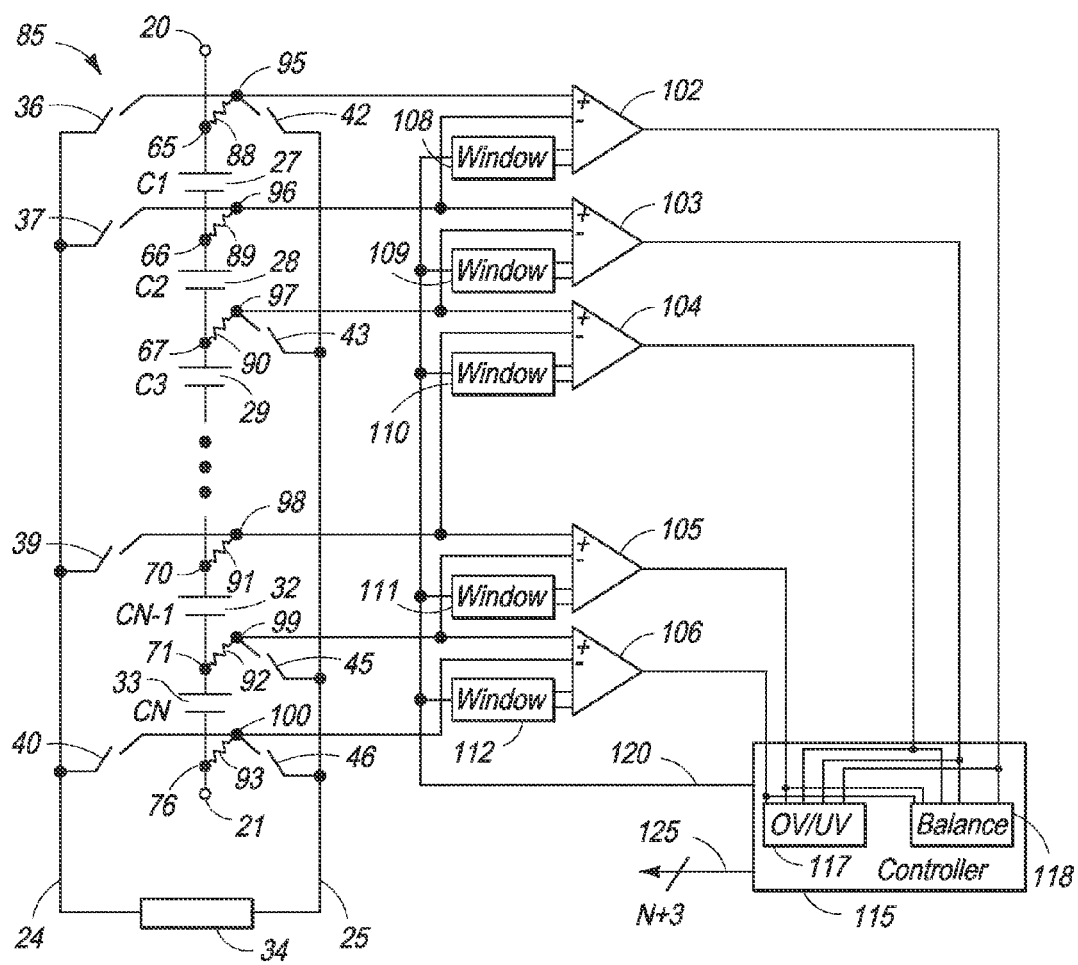
FIG. 5 schematically illustrates an example of an embodiment of a portion of a cell group that includes another switch matrix that is an alternate embodiment of the switch matrix of FIG. 2 in accordance with the present invention.

FIG. 5 schematically illustrates an example of an embodiment of a portion of a cell group 85 that is an alternate embodiment of group 23 (FIG. 2) or either of groups 17 and 18 that were described in the description of FIG. 1. Group 85 is similar to group 23 but includes additional elements. Group 85 includes a plurality of comparators 102-106 that are used for monitoring the state of cells 27-33 such as the state of charge or discharge of cells 27-33. In the preferred embodiment, comparators 102-106 are also used for determining the current used for transferring energy to or from cells 27-33 during an energy transfer operation. In the preferred embodiment, each of comparators 102-106 have a non-inverting input and an inverting input that are used to compare two different signals to two different references. Group 85 also includes a controller 115 that is an alternate embodiment of controller 48 (FIG. 2). Controller 115 is configured to perform the operations of controller 48 and may include other operations in addition. Controller 115 includes outputs 125 that are similar to outputs 49 of controller 48. Although comparators 102-106 are illustrated as external to controller 115, in other embodiments comparators 102-106 may be a portion of controller 115. In some embodiments, controller 115, comparators 102-106, and windows 108-112 form a balancing circuit for cells 27-33.

During normal operation, comparators 102-106 are used to monitor the voltage of cells 27-33 to detect an over-voltage or under-voltage condition as cells 27-33 supply energy to a load such as the electric motor explained in the description of FIG. 1. During an energy transfer operation, such as to balance the voltages and energy storage between cells 27-33, comparators 102-106 are used to monitor a transfer current used to transfer energy from among cells 27-33. For example, during a monitoring interval, comparators 102-106 are used to detect over or under voltage (OV/UV) of cells 27-33 and during a transfer interval comparators 102-106 are used to monitor the transfer current to or from at least one of cells 27-33.

Group 85 also includes optional window reference circuits or windows 108-112 that are used to set upper and lower threshold values for the current used to transfer energy to or from one of cells 27-33. The switch matrix may also include optional current sensor elements that are configured for monitoring the value of the current used for the energy transfers. For example, optional resistors 88-93 may be used to facilitate monitoring the value of the current used for the energy transfers. A first terminal of resistors 88-91 and 93 are connected to the first terminal of respective cells 27-33 and a first terminal of resistor 92 is connected to a second terminal of cell 33. A second terminal of resistors 88-93 is connected to respective nodes 95-100. In this embodiment, nodes 65-71 and 76 serve as sense nodes. A first non-inverting input of comparators 102-106 is connected to respective nodes 95-99 in order to receive the current signal from one terminal of respective cells 27-33. A second inverting input of comparators 102-106 is connected to nodes 96-100 in order to receive the current signal from another terminal of respective cells 27-33.

Those skilled in the art will appreciate that in one embodiment windows 108-112 may have storage elements that store threshold adjustment values, such as values received from controller 115. In other embodiments, windows 108-112 may include programmable analog voltage references that receive digital information from controller 115 and responsively form analog voltages that may be used to adjust the threshold values. For example, windows 108-112 may have a capacitor within the circuitry that allows programming the value to which the capacitor is charged, or may have a programmable digital-to-analog converted. Those skilled in the art will also appreciate that the values from windows 108-112 may be used within respective comparators 102-106 to adjust the internal thresholds for the comparators according to the values stored within windows 108-112.

During the monitoring interval for monitoring the over/under voltage (OV/UV) condition of cells 27-33, controller 115 calculates upper and lower thresholds for the voltage conditions and stores those values in the respective windows 108-112. During the monitoring interval, an over/under voltage (OV/UV) element 117 of controller 115 receives the outputs from comparators 102-106 and detects over or under voltage conditions that occur for each of cells 27-33. During the monitoring interval, there is substantially no current flow through resistors 88-93, thus, substantially no voltage drop across resistors 88-93. Therefore, comparators 102-106 receive the accurate voltage from respective cells 27-33.

Controller 115 is configured to cause, during the transfer interval, the selective enabling or disabling of appropriate ones of the switches to desired ones of cells 27-33, for example to transfer energy to balance the voltage conditions of cells 27-33. In the preferred embodiment, controller 115 is also configured to cause element 117 to ignore the state of comparators 102-106 during the transfer interval. For example, element 117 may blank the signals received from comparators 102-106. Other configurations of controller 115 may use other techniques to minimize the influence of comparators 102-106, or may not ignore the influence. During the transfer interval, at least some of resistors 88-93 have current flowing therethrough and have a corresponding voltage drop across resistors 88-93. While appropriate switches 36, 40, 42, and 46 are selectively enabled to pre-charge element 34, current is flowing through resistors 88 and 93, and the resulting voltage may be used to assist in selectively pre-charging element 34 with the desired current amplitude. This may also assist in verifying that element 34 is charged to the desired current polarity. For this operation, the voltage across resistor 88 always increases which causes comparator 102 to detect that the voltage at node 95 has decreased and negate the output thereof if switches 40 and 42 are closed to pre-charge node 25 to a positive polarity and if switches 36 and 46 are closed to pre-charge node 25 to an opposite [negative] polarity. Alternately, the voltage across resistor 93 may be used. The voltage across resistor 93 always increases which causes comparator 106 to detect that the voltage at node 100 has increased and to assert the output thereof. Typically, the increase in the voltage across resistor (s) 88 and/or 93 gradually increases since there may be an upper limit to the maximum value of the voltage. Controller 115 sets the threshold value of windows 108 and 112 to a desired value of current to be used to pre-charge element 34. In one embodiment, the value of a maximum current that can be accommodated by the inductor of element 34 is converted to a voltage that would appear at that current across resistors 88 and 93 and that value of voltage is set into windows 108 and 112 as the threshold value. When the voltage across resistors 88 and 93 reaches a value that is representative of the desired current value set by the threshold values set into of windows 108 and 112, a balance section 118 of controller 115 detects that element 34 is pre-charged and controller 115 subsequently asserts the appropriate ones of the control signals on outputs 125 to selectively enable the appropriate switches to transfer energy to the desired one of cells 27-33, such as described for the operational sequences explained in the description of FIG. 2. The energy transfer also may be made to any odd number of cells, such as to three (3) cells, five cells (5), etc.

Those skilled in the art will appreciate that although the configuration of FIG. 5 illustrates an example embodiment using an odd number of cells, the technique, method, and circuitry are also applicable to other embodiments including an embodiment using an even number of cells, such as illustrated in FIG. 3. Additionally, although the description describes using switches 36 and 42 and/or switches 40 and 46 to pre-charge element 34 and increase an energy state of one cell of cells 27-33 and/or 53-55, element 34 also may be used to improve the energy state of any number of cells 27-33 and/or 53-55.

Those skilled in the art will also appreciate that other elements may be used as current sense elements instead of resistors 88-93. For example, a resistor in series with element 34 may be used instead of resistors 88-93, or each of resistors 98-93 may be replaced by an MOS transistor configured to be a sense element.

Figure 6:
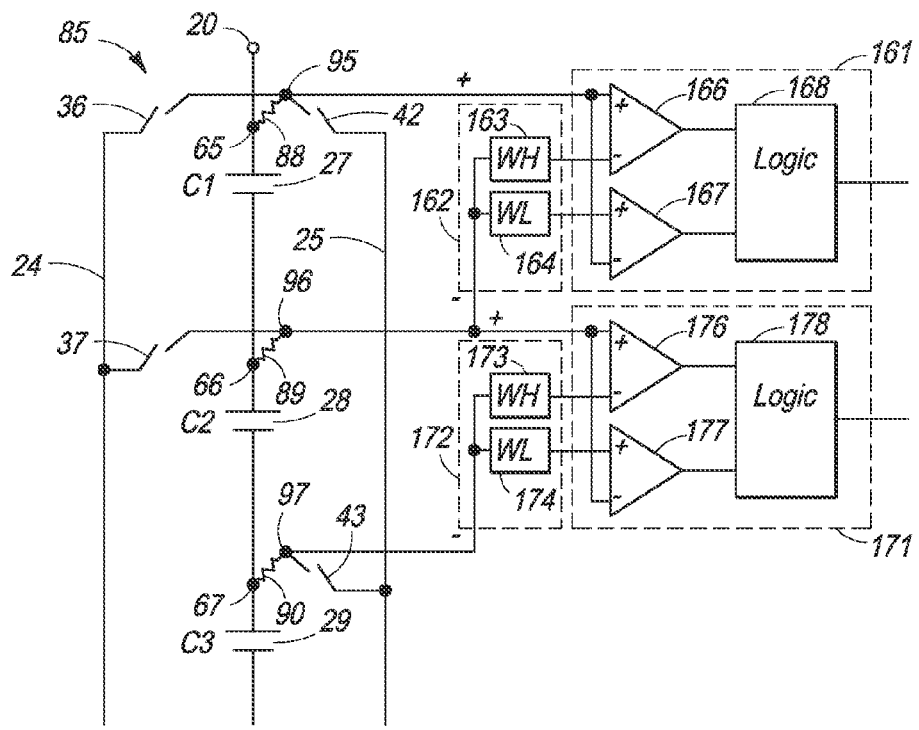
FIG. 6 schematically illustrates an example of an alternate embodiment of a portion of the cell group of FIG. 5 in accordance with the present invention.

FIG. 6 schematically illustrates an example of an alternate embodiment of a portion of cell group 85 of FIG. 5. This alternate embodiment of group 85 includes comparators 161 and 171 that are an alternate embodiment of comparators 102 and 103, and also includes windows 162 and 172 that are alternate embodiments of windows 108 and 109. Comparator 161 is configured with two differential comparators 166 and 167 and a logic block or logic 168 that are configured to operate similarly to comparator 102. Window 162 includes a high window reference or WH 163 and a low window reference or WL 164 that together are an alternate embodiment of window 108 (FIG. 5). WH 163 sets the upper threshold value and WL 164 sets the lower threshold value. Comparator 171 similarly includes two differential comparators 176 and 177 and a logic block or logic 178 that are configured to operate similarly to comparator 103. Window 172 includes a high window reference WH 173 and a low window reference WL 174 that together are an alternate embodiment of window 109 (FIG. 5). WH 173 sets the upper threshold value and WL 174 sets the lower threshold value. The non-inverting and inverting inputs of comparators 161 and 171 are identified in a general manner by respective plus and minus signs.

In one non-limiting operational example, during the balancing mode switches 42 and 37 are closed to pre-charge element 34 (FIG. 5) from cell 27. The voltage across resistors 88 and 89 causes the differential voltage between the non-inverting and inverting inputs of comparator 161 to be less than WH and greater than WL and with the differential voltage decreasing as element 34 charges. As the differential voltage decreases below WL, the output of comparator 167 is negated thereby causing the output of logic 168 to be asserted. If element 34 is discharging into cell 27 to increase the energy state of cell 27, the differential input voltage is greater than WH and is decreasing as element 34 discharges. As the differential voltage decreases below WH, the output of comparator 166 is asserted thereby causing the output of logic 168 to be asserted.

Those skilled in the art will appreciate that other configurations can be used since the values of WH and WL are programmable, the comparators may be connected in other configurations. For example, controller 115 (FIG. 5) may use the output of comparator 104 to determine when element 34 is charged or discharged by proper adjustments to the values of the windows 108-112.

Figure 7:
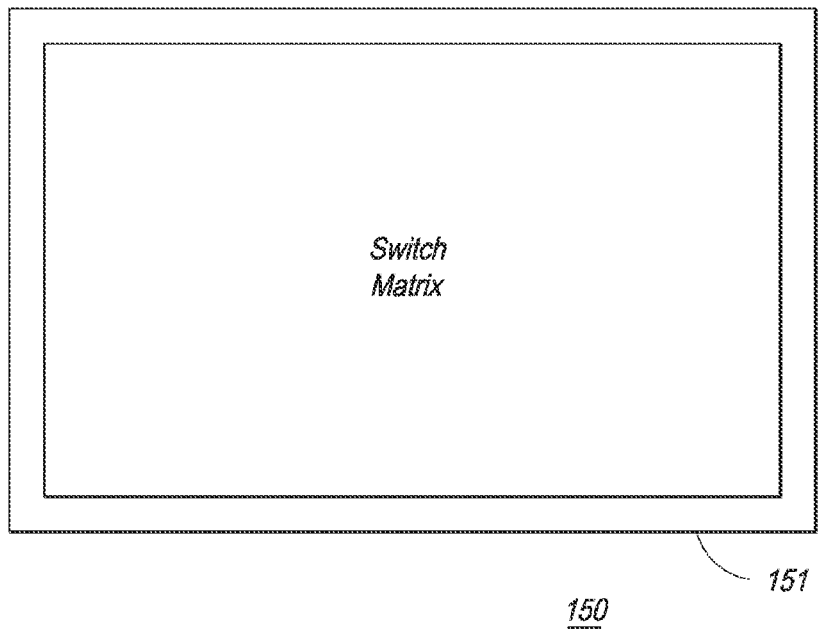
FIG. 7 illustrates an enlarged plan view of a semiconductor device that includes the switch matrix of any of FIGS. 2-3 and 5 in accordance with the present invention.

FIG. 7 illustrates an enlarged plan view of a portion of an embodiment of a semiconductor device or integrated circuit 150 that is formed on a semiconductor die 151. In one embodiment, any of controllers 48 or 115 of FIGS. 2-6 may be formed on die 151. In another embodiment, die 151 may include some or all of the switch matrixes, and/or may include other circuits, such as some or that are not shown in FIG. 6 for simplicity of the drawing. In another embodiment, any of controllers 48 or 115 and/or some or all of the switches of FIGS. 2-6 may be formed on die 151. In most embodiments, element 34 and cells 27-33 and/or 53-55 are external to circuit 150. The device or integrated circuit 150 is formed on die 151 by semiconductor manufacturing techniques that are well known to those skilled in the art.

From all the foregoing one skilled in the art can appreciate that according to one embodiment, a switch matrix of a balancing circuit for a plurality of battery cells may comprise a first common node, for example node 24, configured for coupling to a first terminal of a transfer element;

a second common node, for example node 25, configured for coupling to a second terminal of the transfer element a first node, for example node 65, for coupling to a first terminal of a first cell, for example cell 27, of a plurality of series coupled cells wherein the first terminal of the first cell has a first polarity type;

a second node, for example node 76, for coupling to a first terminal of a second cell that is a last cell of the plurality of series coupled cells wherein the first terminal of the last cell has a second polarity type that is opposite to the first polarity type;

a third node, for example node 66, for coupling to a first terminal of a third cell of the plurality of series coupled cells wherein the first terminal of the third cell has the first polarity type;

a fourth node, for example node 71 or 75, for coupling to a second terminal of the last cell of the plurality of series coupled cells wherein the second terminal of the last cell has the first polarity type;

a first ladder switch, switch 37 for example, having a first terminal coupled to the third node and having a second terminal coupled to the first common node;

a first switch pair, switches 36 and 42 for example, having a first pair of switches with each switch of the first switch pair having a first terminal coupled to the first node, a first switch of the first switch pair having a second terminal coupled to the first common node, and a second switch of the first switch pair having a second terminal coupled to the second common node;

a second switch pair, switches 40 and 46 for example, having a second pair of switches with each switch of the second switch pair having a first terminal coupled to the second node, a first switch of the second switch pair having a second terminal coupled to the first common node, and a second switch of the second switch pair having a second terminal coupled to the second common node; and a second ladder switch, for example switch 45 or 58, having a first terminal coupled to the fourth node and having a second terminal coupled to one of the first common node if a total number of cells in the plurality of series coupled cells is an even number or coupled to the second common node if the total number of cells in the plurality of series coupled cells is an odd number.

In another embodiment, the switch matrix may include that the second terminal of the first ladder switch is coupled to the first common node independently of an operational state, for example not selectively coupled to node 24 or in another example regardless of the open or closed state of, of the first switch pair or of the second switch pair.

Another embodiment of the switch matrix may include that the first switch of the first switch pair and the second switch of the second switch pair are configured (for example coupled as shown in FIG. 2 or 3) so that they may be selectively enabled by a control signal, to be selectively enabled to charge an inductor prior to selectively enabling any ladder switch to transfer charge from the inductor to a cell of the plurality of series coupled cells.

Another embodiment may include a plurality of current sense elements, such as any of elements 88-93, with one current sense element of the plurality of current sense elements coupled between the first terminal of each ladder switch and the first terminal of each cell of the plurality of series coupled cells.

In one embodiment, the switch matrix may include a third ladder switch, for example switch 43, having a first terminal coupled to the second common node and having a second terminal configured to be coupled solely to a second terminal of the third cell wherein the second terminal of the third cell has the second polarity type.

Those skilled in the art will also appreciate that another embodiment of a switch matrix for a plurality of battery cells may comprise: a first node, node 65 for example, configured for coupling to one of a positive or a negative terminal of a first cell, positive terminal of cell 27 for the cells oriented as shown in FIG. 2 or a negative terminal if cell 27 is reversed, of a plurality of series connected cells;

a second node, such as node 76, configured for coupling to an opposite polarity terminal of a second cell, for example to bottom plate of cell 33 or 55, of the plurality of series connected cells;

a third node, for example node 71 or 75, configured for coupling to a another terminal of the second cell (such as top plate of cell 33 or 55), the another terminal of the second cell having a polarity that is the same polarity as the one of the positive or the negative terminal of the first cell;

a first common node, for example node 24, configured for coupling to a first terminal of a transfer element;

a second common node, for example node 25, configured for coupling to a second terminal of the transfer element;

a first switch pair, switches 36 and 42 for example, with each switch of the first switch pair having a first terminal coupled to the first node, each switch of the first switch pair having a second terminal; and a second switch pair, switches 40 and 46 for example, with each switch of the second switch pair having a first terminal coupled to the second node, each switch of the second switch pair having a second terminal wherein the second terminal of a first switch, switch 36 for example, of the first switch pair is coupled to the second terminal of a first switch, switch 40 for example, of the second switch pair and to the first common node and wherein the second terminal of a second switch, for example switch 42 for example, of the first switch pair is coupled to the second terminal of a second switch, switch 46 for example, of the second switch pair and coupled to the second common node, for example node 25.

Those skilled in the art will also appreciate that one embodiment of a method of forming a balancing circuit for a plurality of battery cells may comprise: configuring the balancing circuit to selectively pre-charge a transfer element, element 34 for example, with either of a first or second polarity (for example positive charge on the terminal at node 24 or alternately negative on the terminal at node 24) from a power source, such as the power source between input 20 and return 21, and to subsequently selectively couple the transfer element to at least one battery cell of the plurality of battery cells to transfer energy from the transfer element to the one battery cell.

Another embodiment of the method may include configuring the balancing circuit to subsequently selectively pre-charge the transfer element from the power source with an opposite polarity (for example negative charge on the terminal at node 24 or alternately positive on the terminal at node 24) to the first or second polarity.

Another embodiment of the method may include configuring the balancing circuit to selectively pre-charge the transfer element from the power source that is one of external to the plurality of battery cells or all of the plurality of battery cells, or a combination of both external to the plurality of battery cells and all of the plurality of battery cells.

Another embodiment of the method may include configuring a controller, controller 14 or 48 or 115 for example, of the balancing circuit to selectively enable a first switch of a first switch pair, switches 36 and 42 for example, and a first switch of a second switch pair, switches 40 and 46 for example, to pre-charge the transfer element to a first polarity and subsequently to selectively enable a second switch of the first switch pair and a second switch of the second switch pair to pre-charge the transfer element to a second polarity that is the opposite of the first polarity.

Another embodiment of the method may include configuring the controller to selectively enable the first switch of the first switch pair and the second switch of the second switch pair to pre-charge the transfer element from a power source, for example the power source between input 20 and return 21, external to the plurality of battery cells prior to selectively enabling any switches to transfer charge from the transfer element to a battery cell of the plurality of series coupled battery cells.

Yet another embodiment of the method may include forming a first switch of a first switch pair and a first switch of a second switch pair to be coupled between a first terminal of the transfer element and a power input of the balancing circuit, and forming a second switch of the first switch pair and a second switch of the second switch pair to be coupled between a second terminal of the transfer element and a power return of the balancing circuit.

The method may further include forming a controller, for example controller 14, or 48 or 115, of the balancing circuit to selectively enable, for example assert control signal coupled to the switches, the first switch of the first switch pair and the second switch of the second switch pair to selectively pre-charge the transfer element.

Another embodiment of the method may include configuring the balancing circuit to selectively pre-charge the transfer element with an opposite polarity (for example an opposite of the polarity formed previously, for example negative charge on the terminal at node 24 or alternately positive on the terminal at node 24, from the power source subsequently to selectively coupling the transfer element to at least one battery cell In view of all of the above, it is evident that a novel device and method is disclosed. Included, among other features, is forming a first pair of switches and a second pair of switches to pre-charge an inductor prior to using the inductor to transfer energy to a cell such as one of cells 27-33, wherein substantially no other charge or discharge cycles occur between pre-charging the inductor and using the inductor to transfer charge into the cell. Pre-charging the inductor prior to transferring energy into the cell minimizes the number of cycles used to balance of other cells that have the charge state affected by the energy transfer. Also included is a method of transferring energy into a cell by forming a monitoring interval to monitor a charge state of a cell and forming a transfer interval to transfer energy into a cell wherein the monitor interval and the transfer interval use the same set of comparators for both intervals. Using the same comparators reduces the number of components thereby reducing costs.

While the subject matter of the descriptions are described with specific preferred embodiments and example embodiments, the foregoing drawings and descriptions thereof depict only typical and example embodiments of the subject matter and are not therefore to be considered to be limiting of its scope, it is evident that many alternatives and variations will be apparent to those skilled in the art. As will be appreciated by those skilled in the art, other types of current sensors may be used to sense the value of the current used to pre-charge element 34 instead of resistors 88-93. For example, a transistor may be used to sense the current. Additionally, other implementations of comparators may be used instead of comparators 102-106. For example, each of comparators 102-106 may be replaced by two comparators and digital logic, such as AND gates, to compare the outputs of the two comparators. Also, the transistors used to implement the switches of the switch matrix may be P-channel instead of N-channel or may be other transistor types such a bipolar transistors.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A switch matrix of a balancing circuit for a plurality of battery cells comprising:
   a first common node configured for coupling to a first terminal of a transfer element;
   a second common node configured for coupling to a second terminal of the transfer element
   a first node for connecting directly to a power input terminal of the switch matrix and to a first terminal of a first cell of a plurality of series coupled cells wherein the first terminal of the first cell has a first polarity type;
   a second node for coupling to a power return terminal of the switch matrix and for coupling to a first terminal of a second cell that is a last cell of the plurality of series coupled cells wherein the first terminal of the last cell has a second polarity type that is opposite to the first polarity type;
   a third node for coupling to a first terminal of a third cell of the plurality of series coupled cells wherein the first terminal of the third cell has the first polarity type;
   a fourth node for coupling to a second terminal of the last cell of the plurality of series coupled cells wherein the second terminal of the last cell has the first polarity type;
   a first ladder switch having a first terminal coupled to the third node and having a second terminal coupled to the first common node;
   a first switch pair having a first pair of switches with each switch of the first switch pair having a first terminal coupled to the power input terminal and the first node, a first switch of the first switch pair having a second terminal coupled to the first common node, and a second switch of the first switch pair having a second terminal coupled to the second common node;
   a second switch pair having a second pair of switches with each switch of the second switch pair having a first terminal coupled to the power return terminal and the second node, a first switch of the second switch pair having a second terminal coupled to the first common node, and a second switch of the second switch pair having a second terminal coupled to the second common node; and
   a second ladder switch having a first terminal coupled to the fourth node and having a second terminal coupled to one of the first common node if a total number of cells in the plurality of series coupled cells is an even number or coupled to the second common node if the total number of cells in the plurality of series coupled cells is an odd number.

2. The switch matrix of claim 1 wherein the second terminal of the first ladder switch is coupled to the first common node independently of an operational state of the first switch pair or of the second switch pair.

3. The switch matrix of claim 1 wherein the second terminal of the second ladder switch is coupled to the one of the first common node or the second common node independently of an operational state of the first switch pair or of the second switch pair.

4. The switch matrix of claim 1 wherein the first node is further configured for coupling to a first voltage input terminal of the plurality of series coupled cells.

5. The switch matrix of claim 4 wherein the second node is further configured for coupling to a voltage return terminal of the plurality of series coupled cells.

6. The switch matrix of claim 1 wherein the first switch of the first switch pair and the second switch of the second switch pair are selectively enabled to charge an inductor prior to selectively enabling any ladder switch to transfer charge from the inductor to a cell of the plurality of series coupled cells.

7. The switch matrix of claim 1 further including a current sense element coupled between the first terminal of the first ladder switch and the third node.

8. The switch matrix of claim 1 further including a plurality of current sense elements with one current sense element of the plurality of current sense elements coupled between the first terminal of each ladder switch and the first terminal of each cell of the plurality of series coupled cells.

9. The switch matrix of claim 1 further including a third ladder switch having a first terminal coupled to the second common node and having a second terminal configured to be coupled to a second terminal of the third cell wherein the second terminal of the third cell has the second polarity type.

10. The switch matrix of claim 1 wherein the fourth node is also configured for coupling to a first terminal of a next to last cell of the plurality of series coupled cells wherein the first terminal of the next to last cell has the second polarity type.

11. A switch matrix of a balancing circuit for a plurality of battery cells comprising:
    a first common node configured for coupling to a first terminal of a transfer element;
    a second common node configured for coupling to a second terminal of the transfer element
    a first node for coupling to a first terminal of a first cell of a plurality of series coupled cells wherein the first terminal of the first cell has a first polarity type;
    a second node for coupling to a first terminal of a second cell that is a last cell of the plurality of series coupled cells wherein the first terminal of the last cell has a second polarity type that is opposite to the first polarity type;
    a third node for coupling to a first terminal of a third cell of the plurality of series coupled cells wherein the first terminal of the third cell has the first polarity type;

a fourth node for coupling to a second terminal of the last cell of the plurality of series coupled cells wherein the second terminal of the last cell has the first polarity type;

a first ladder switch having a first terminal coupled to the third node and having a second terminal coupled to the first common node;

a first switch pair having a first pair of switches with each switch of the first switch pair having a first terminal coupled to the first node, a first switch of the first switch pair having a second terminal coupled to the first common node, and a second switch of the first switch pair having a second terminal coupled to the second common node;

a second switch pair having a second pair of switches with each switch of the second switch pair having a first terminal coupled to the second node, a first switch of the second switch pair having a second terminal coupled to the first common node, and a second switch of the second switch pair having a second terminal coupled to the second common node; and a second ladder switch having a first terminal coupled to the fourth node and having a second terminal coupled to one of the first common node if a total number of cells in the plurality of series coupled cells is an even number or coupled to the second common node if the total number of cells in the plurality of series coupled cells is an odd number;

wherein the switch matrix includes only N+3 switches where N is a total number of cells of the plurality of series coupled cells.

12. A switch matrix for a plurality of battery cells comprising:

a first node configured for connecting directly to one of a first combination that includes a power input terminal of the switch matrix and a positive terminal of a first cell of a plurality of series connected cells or a second combination that includes a power return terminal of the switch matrix and a negative terminal of the first cell of the plurality of series connected cells;

a second node configured for coupling to an opposite polarity terminal of a second cell of the plurality of series connected cells and to a different one of the power input terminal or the power return terminal;

a third node configured for coupling to another terminal of the second cell, the another terminal of the second cell having a polarity that is the same polarity as the one of the positive or the negative terminal of the first cell;

a first common node configured for coupling to a first terminal of a transfer element;

a second common node configured for coupling to a second terminal of the transfer element;

a first switch pair with each switch of the first switch pair having a first terminal coupled to the first node, each switch of the first switch pair having a second terminal; and a second switch pair with each switch of the second switch pair having a first terminal coupled to the second node, each switch of the second switch pair having a second terminal wherein the second terminal of a first switch of the first switch pair is coupled to the second terminal of a first switch of the second switch pair and to the first common node and wherein the second terminal of a second switch of the first switch pair is coupled to the second terminal of a second switch of the second switch pair and coupled to the second common node.

13. The switch matrix of claim 12 further including a ladder switch configured to couple the third node to the second common node if a number of cells is odd and to the first common node if the number of cells is even.

14. The switch matrix of claim 12 wherein the second cell is the last cell of the plurality of series coupled cells and wherein the third node is also configured for coupling to a first terminal of a next to last cell of the plurality of series coupled cells wherein the first terminal of the next to last cell has a polarity type that is the same as the polarity of the terminal coupled to the second node.

\* \* \* \* \*